US011489716B2

(12) United States Patent
Rivera (10) Patent No.: US 11,489,716 B2
(45) Date of Patent: Nov. 1, 2022

(54) DESKTOP VIRTUALIZATION WITH A DEDICATED CELLULAR NETWORK CONNECTION FOR CLIENT DEVICES

(71) Applicant: CITRIX SYSTEMS, INC., Fort Lauderdale, FL (US)

(72) Inventor: Juan C. Rivera, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 247 days.

(21) Appl. No.: 16/545,135

(22) Filed: Aug. 20, 2019

(65) Prior Publication Data

US 2021/0058283 A1 Feb. 25, 2021

(51) Int. Cl.
| | |
|---|---|
| *H04L 41/0668* | (2022.01) |
| *H04W 76/18* | (2018.01) |
| *H04L 45/00* | (2022.01) |
| *H04L 45/28* | (2022.01) |
| *H04W 40/34* | (2009.01) |
| *H04L 12/46* | (2006.01) |

(52) U.S. Cl.
CPC .......... *H04L 41/0668* (2013.01); *H04L 45/22* (2013.01); *H04L 45/28* (2013.01); *H04W 40/34* (2013.01); *H04W 76/18* (2018.02); *H04L 12/4641* (2013.01)

(58) Field of Classification Search
CPC . H04L 12/4641; H04L 41/0668; H04L 45/22; H04L 45/28; H04L 69/40; H04W 40/34; H04W 76/18
See application file for complete search history.

(56) References Cited

U.S. PATENT DOCUMENTS

| | | | | |
|---|---|---|---|---|
| 9,106,887 B1* | 8/2015 | Owen | ...................... | H04L 41/22 |
| 10,104,710 B1* | 10/2018 | Hodge | .................. | H04W 12/37 |
| 2008/0176548 A1* | 7/2008 | Liang | ................ | H04W 52/0229 |
| | | | | 455/419 |
| 2009/0106571 A1* | 4/2009 | Low | ...................... | G06F 9/4856 |
| | | | | 713/310 |
| 2011/0022812 A1* | 1/2011 | van der Linden | .. | H04L 67/1097 |
| | | | | 711/163 |
| 2011/0252238 A1* | 10/2011 | Abuan | ................ | H04L 61/2589 |
| | | | | 713/168 |
| 2013/0016606 A1* | 1/2013 | Cirkovic | .................. | H04L 43/10 |
| | | | | 370/225 |
| 2014/0056122 A1* | 2/2014 | Singal | ..................... | H04L 45/28 |
| | | | | 370/220 |
| 2015/0016241 A1* | 1/2015 | Ruffini | .................. | H04W 40/28 |
| | | | | 370/216 |

(Continued)

*Primary Examiner* — Khaled M Kassim
(74) *Attorney, Agent, or Firm* — Allen, Dyer, Doppelt + Gilchrist, PA (57) ABSTRACT

A computer system includes a virtual server to provide virtual computing sessions, and a client device to access one of the virtual computing sessions via a communications network. The client device includes a wireless transceiver connected to a cellular network. A server communicates with the client device via the cellular network based on the client device losing connectivity to the communications network. The cellular network provides a backup communications channel for the server to restore connectivity for the client device to access one of the virtual computing sessions via the communications network.

17 Claims, 9 Drawing Sheets

(56) References Cited

U.S. PATENT DOCUMENTS

| | | | |
|---|---|---|---|
| 2015/0019733 A1 | 1/2015 | Suryanarayanan et al. | |
| 2015/0142925 A1* | 5/2015 | Hix | H04L 65/60 |
| | | | 709/219 |
| 2015/0156056 A1* | 6/2015 | Lowery | H04L 69/08 |
| | | | 455/420 |
| 2015/0169419 A1* | 6/2015 | Carney | H04L 69/40 |
| | | | 714/4.11 |
| 2016/0080248 A1* | 3/2016 | Rijnders | H04L 41/5009 |
| | | | 709/224 |
| 2017/0093611 A1* | 3/2017 | Arora | H04L 12/4641 |
| 2017/0111446 A1* | 4/2017 | Rivera | H04L 67/1008 |
| 2017/0279927 A1* | 9/2017 | Ramareddy | G06F 9/452 |
| 2018/0060572 A1* | 3/2018 | Singleton | G06F 9/45558 |
| 2018/0331918 A1 | 11/2018 | Woodmansee et al. | |
| 2019/0200204 A1* | 6/2019 | Gross | H04W 4/029 |
| 2019/0327113 A1* | 10/2019 | Kandasamy | H04L 41/0627 |
| 2021/0042197 A1* | 2/2021 | Rivera | G06F 11/301 |

* cited by examiner

DESKTOP VIRTUALIZATION WITH A DEDICATED CELLULAR NETWORK CONNECTION FOR CLIENT DEVICES

TECHNICAL FIELD

The present disclosure relates to desktop virtualization, and more particularly, to remotely accessing a client device with a cellular network connection dedicated as a backup communications channel.

BACKGROUND

There are several different types of desktop virtualization systems. As an example, Virtual Desktop Infrastructure (VDI) refers to the process of running a user desktop inside a virtual machine that resides on a server, with the virtual machine providing a virtual computing session.

Servers in such systems may include storage for virtual desktop images and system configuration information, as well as software components to provide the virtual desktops and allow users to interconnect to them. For example, a VDI server may include one or more hypervisors to create and maintain multiple virtual machines, software to manage the hypervisors, a connection broker, and software to provision and manage the virtual desktops.

In desktop virtualization systems, client devices access the virtual desktops via a communications network. There are several cloud service providers that organizations may turn to in order to provide desktop virtualization systems for their users via the communications network. Example cloud service providers include Microsoft Azure and Amazon Web Services.

SUMMARY

A computer system comprises a virtual server to provide a plurality of virtual computing sessions, and a client device to access one of the virtual computing sessions via a communications network. The client device includes a wireless transceiver connected to a cellular network. A server communicates with the client device via the cellular network in response to the client device losing connectivity to the communications network. The cellular network provides a backup communications channel for the server to restore connectivity for the client device to access one of the virtual computing sessions via the communications network.

The client device may be connected to the cellular network when also connected to the communications network.

The client device cannot access one of the virtual computing sessions via the cellular network based on the client device losing connectivity to the communications network.

The server may be configured to perform management and troubleshooting tasks on the client device. The management and troubleshooting tasks may comprise at least one of the following: reboot the client device, update software in the client device, and update configuration settings in the client device to enable connectivity to the communications network.

The client device may comprise a communications network interface for interfacing with the communications network, and a first processor coupled to the communications network interface to access one of the virtual computing sessions via the communications network. A second processor may be coupled to the wireless transceiver and configured to restore connectivity to the communications network, and with the wireless transceiver being isolated from the first processor.

The client device may receive configuration parameters to connect to the communications network for a first time from the server via the wireless transceiver. The configuration parameters may be provided to the wireless receiver without having to prompt an end user of the client device.

The server may validate the client device via the wireless transceiver so that the client device can connect to the communications network for a first time. The server may perform the validation by comparing initialization information provided by the client device to initialization information expected for the client device. The initialization information to be used to determine that files installed on the client device have not been altered.

The client device may be configured as a thin client device.

Another aspect is directed to a client device comprising a communications network interface to interface with a communications network, and a first processor coupled to the communications network interface to access a virtual computing session via the communications network in response to the communications network interface having connectivity to the communications network. A wireless transceiver is connected to a cellular network. A second processor is coupled to the wireless transceiver to communicate with a server via the cellular network in response to the communications network interface losing connectivity to the communications network. The cellular network provides a backup communications channel for the server to restore connectivity of the communications network interface to the communications network for the first processor to access the virtual computing session via the communications network.

Yet another aspect is directed to a method for operating a client device. The method includes operating a first processor coupled to a communications network interface to access a virtual computing session via a communications network in response to the communications network interface having connectivity to the communications network. The method further includes operating a second processor coupled to a wireless transceiver to communicate with a server via a cellular network in response to the communications network interface losing connectivity to the communications network. The cellular network provides a backup communications channel for the management server to restore connectivity of the communications network interface to the communications network for the first processor to access the virtual computing session via the communications network.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed below, organizations and enterprises turn to cloud service providers to provide desktop virtualization systems for their users. With desktop virtualization, client devices access virtual computing sessions over a communications network. The communications network is also used by administrators to manage, configure and support client devices as needed.

At times, client devices may have issues that prevent connection to the communications network. This requires the administrators to physically go to the client devices to restore network connectivity. Manual restoration of physical connections at client devices may not be possible in many instances. For example, some enterprise users may have thousands of client devices. Such numbers make it impractical or otherwise practically impossible to physically connect each machine because the cost to do so would be extraordinarily high.

Besides large numbers, device location can also pose a challenge to administrators who are responsible to ensure company devices are up and running properly. For instance, companies that have employees across the globe may also have computing devices across many geographical locations. Thus, differently located computing resources also inhibit or otherwise prevent easy and efficient physical reconnection of computing devices. This is especially true nowadays when many workers are telecommuting or simply working remotely.

In today's corporate environments, a company's information technology (IT) staff is often times not at the same location as the company's employees. Such environments pose significant challenges regarding network connectivity of company resources. The techniques and teachings of the present disclosure provide cellular network connections in client devices as a backup communications channel, and thereby enable administrators to remotely access the client devices and perform maintenance and troubleshooting tasks during a loss of connectivity to the communications network.

Figure 1:
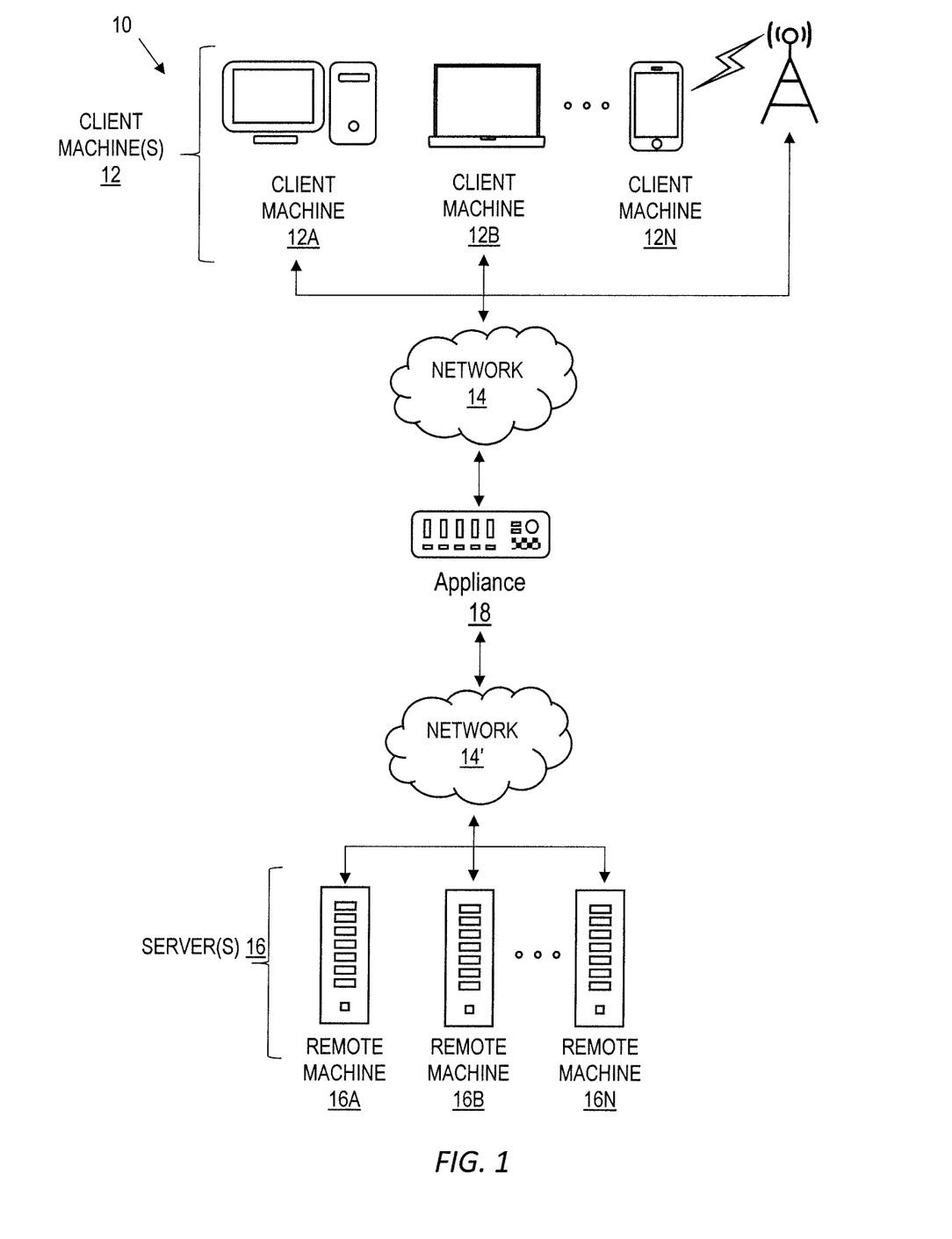
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
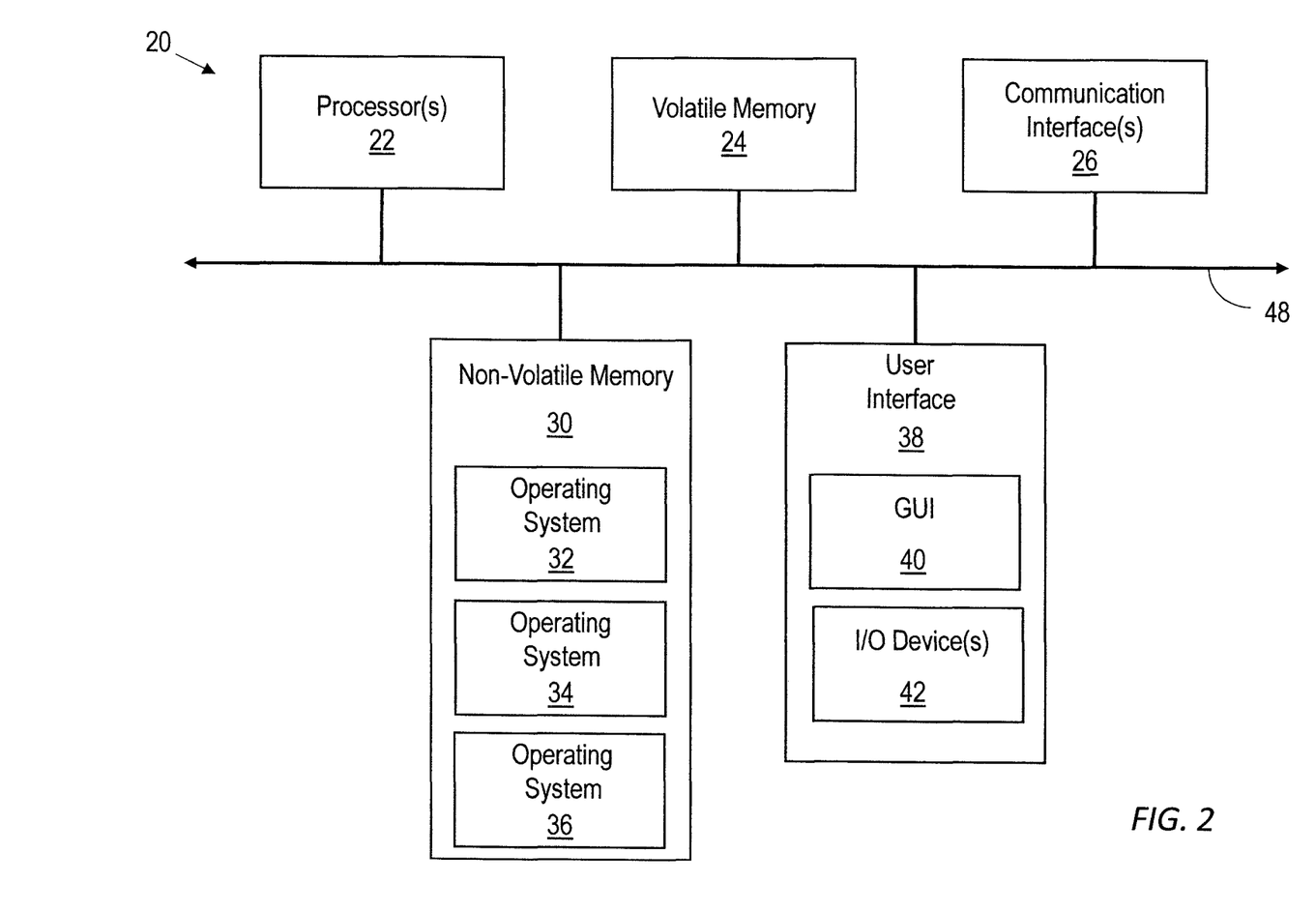
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
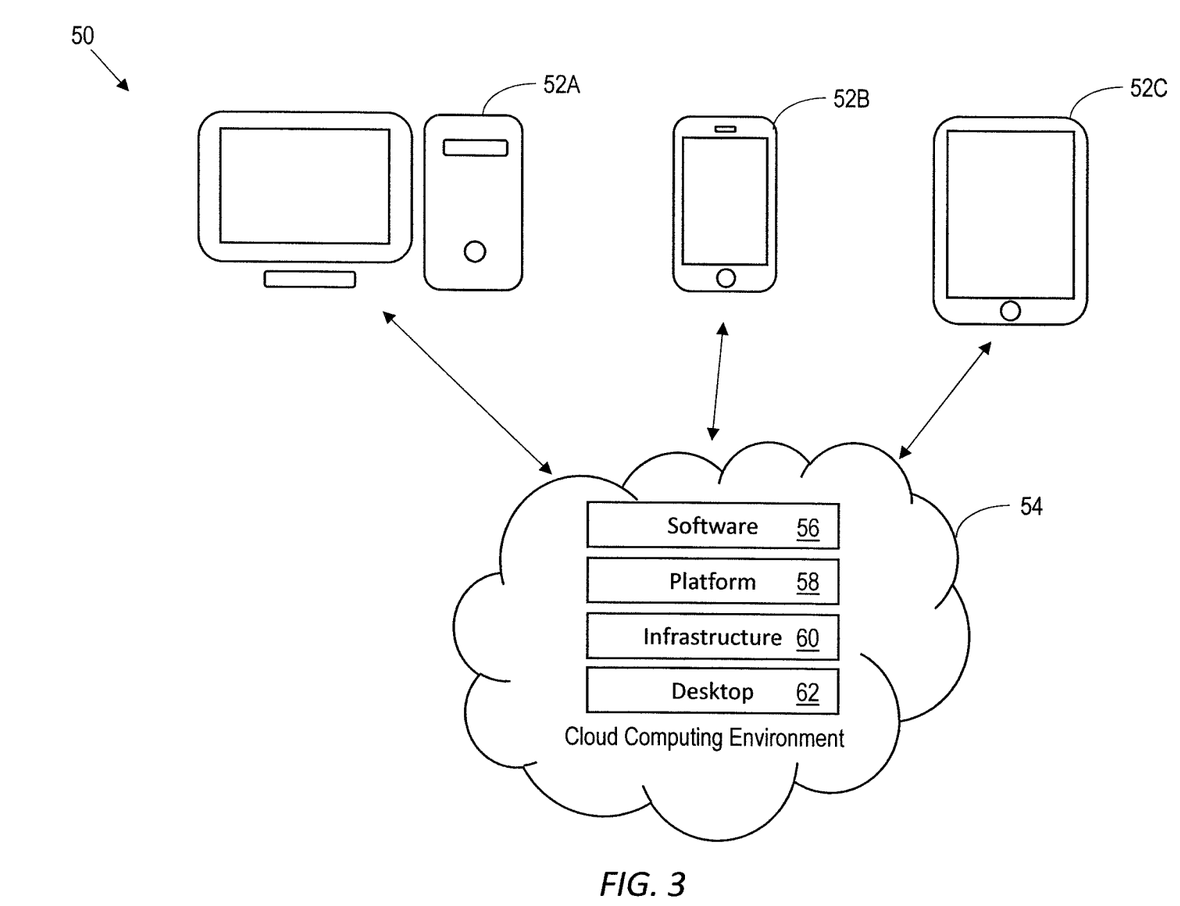
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. CITRIX CLOUD is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
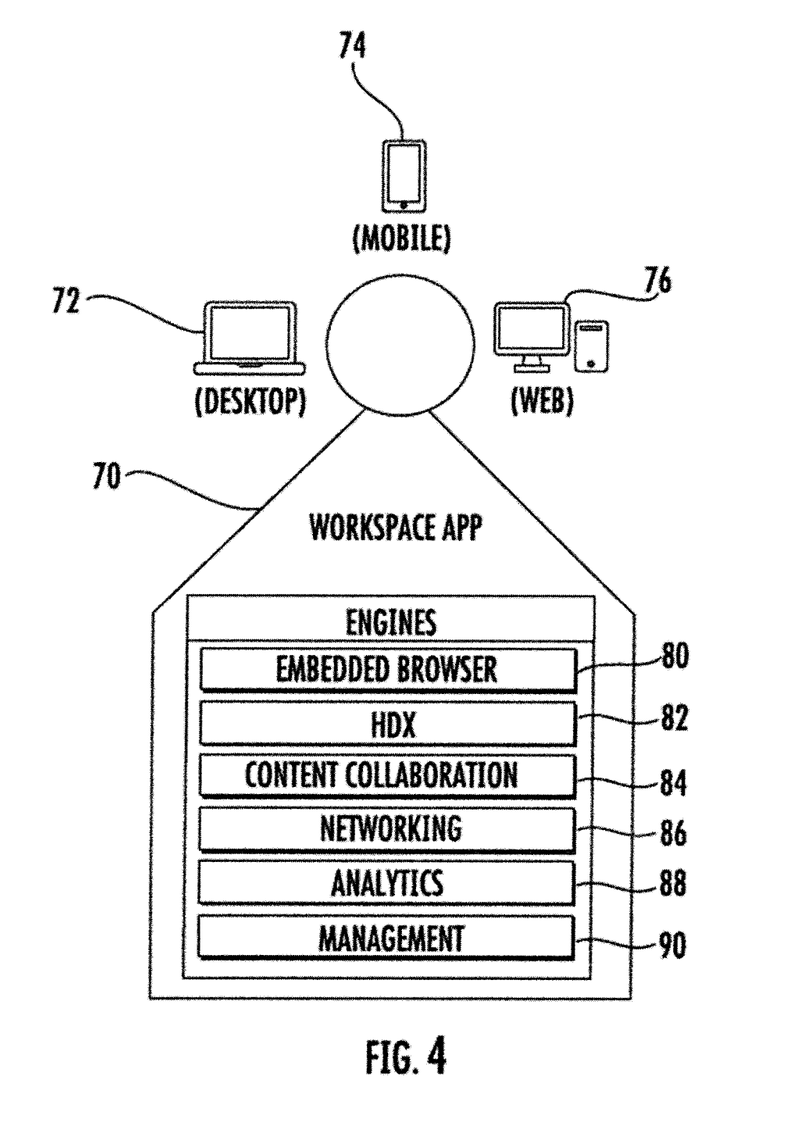
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide users access to their workspace environment. The web version of the workspace app 70 is used when a user does not want to install the workspace app or does not have the rights to install the workspace app, such as when operating a public kiosk 76.

Each of these different versions of the workspace app 70 may provide the same user experience. This allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Engines 80-90 optimize the user experience for a particular resource, and also provide an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression techniques. Such techniques can be optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current in terms of performance and policies. This not only provides users with the latest capabilities, but also includes extra security enhancements. The workspace app 70 includes an auto-update service that routinely checks and automatically deploys updates based on customizable policies.

Figure 5:
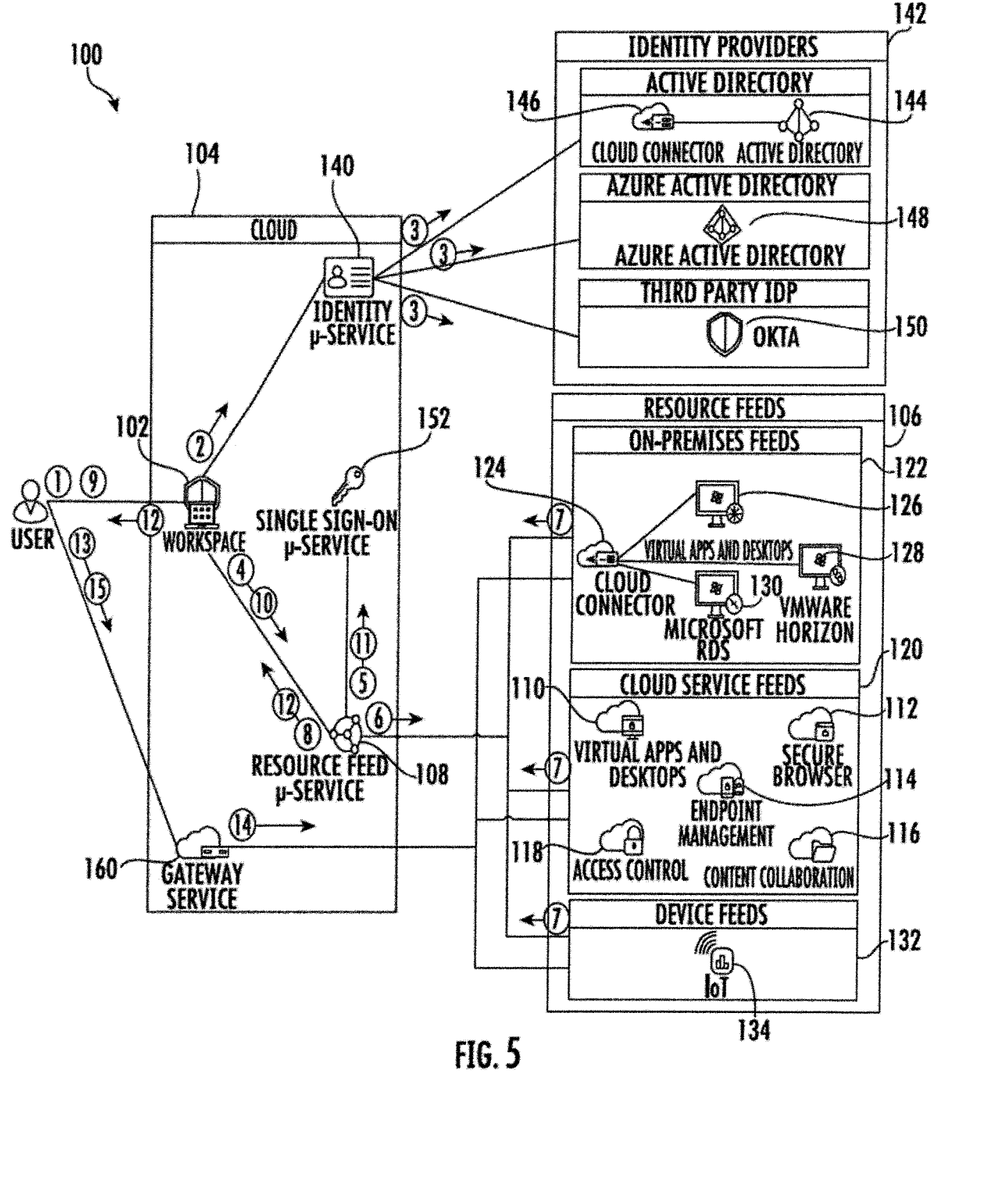
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104, such as Citrix Cloud, for example. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, VMware Horizon 128 or Microsoft RDS 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through a Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The workspace experience service 102 is a component of the Cloud 104 that enumerates and delivers workspace resources to the workspace user experience. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource via the gateway service 160 (event 15). Having an entire workspace delivered through a single access point or application advantageously improves productivity and streamlines common workflows for the user.

Figure 6:
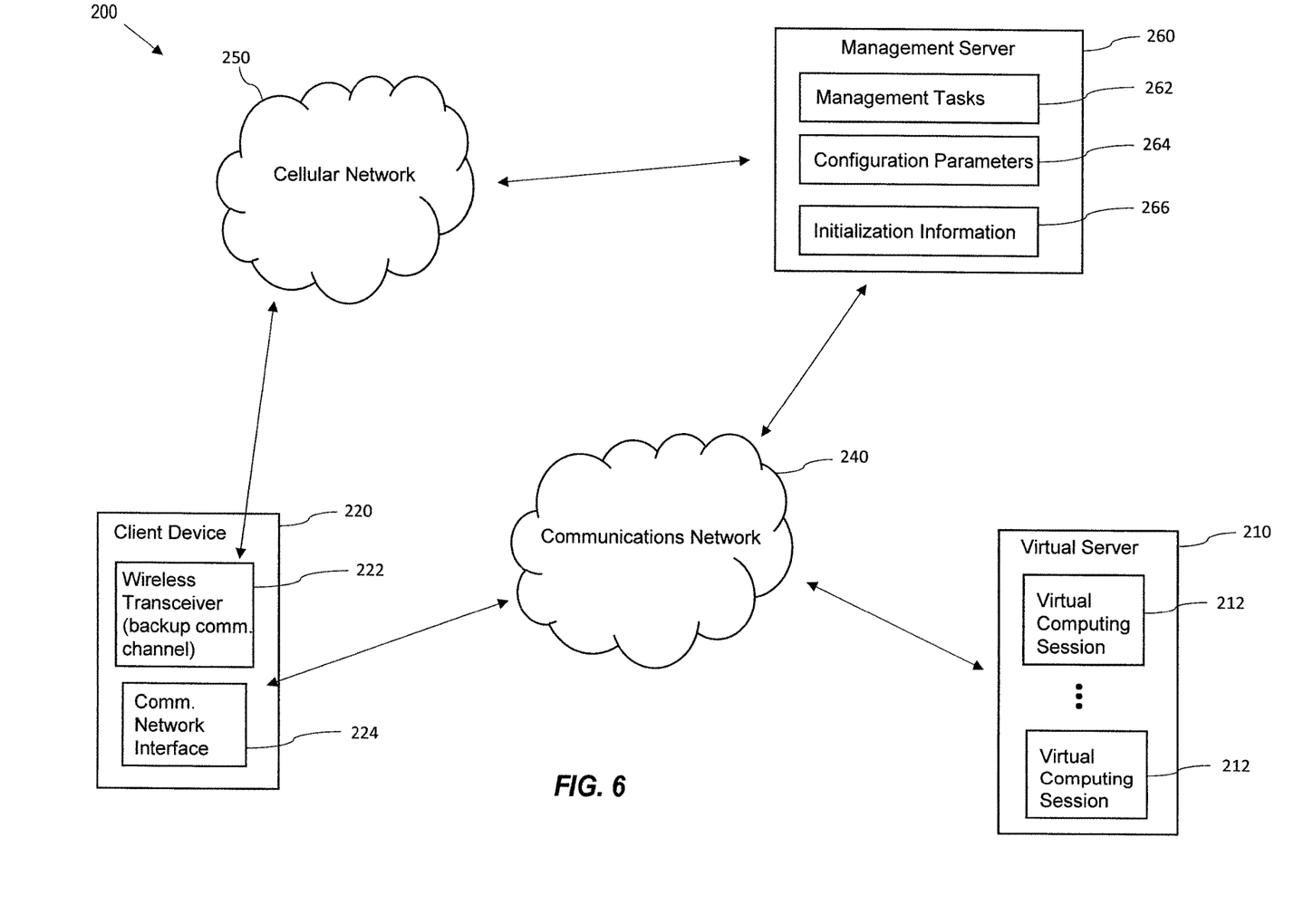
FIG. 6 is a schematic block diagram of a computer system with a client device having a cellular network connection dedicated as a backup communications channel in which various aspects of the disclosure may be implemented.

Referring now to FIG. 6, the illustrated computer system 200 includes a client device 220 accessing a virtual computing session 212 via a communications network 240. The communications network 240 also enables the exchange of data to execute programs, applications, and sub-routines on the client device 220 as well as provision of the virtual computing session 212. The client device 220 may also interface with a management server 260 via the communications network 240. The management server 260 may be generally referred to as a server 260, and is used by administrators to perform management tasks 262 on the client device 200, including device management and troubleshooting.

Device management includes, for example, updating the BIOS of the client device 220, collecting log files of events that occur in an operating system of the client device 220, as well as updating configuration settings and updating the system image. Configuration settings may include proxy settings required for the client device 220 to connect to the communications network 240.

Troubleshooting is required, for example, when the client device 220 has a software issue that prevents the client device 220 from operating correctly. The end-user of the client device 220 notifies an administrator when the client device 220 is not operating correctly. This may involve the administrator using the management server 260 to initiate a reboot of the client device 220. For example, a reboot is necessary when the operating system or a hardware driver has stopped working. A graphics driver may crash causing the operating system to be frozen, or a software code may be stuck in a misbehaving state. A reboot will bring the client device 220 up from scratch, restarting all the software so it will work just as well as it was working before.

When the client device 220 is connected to the communications network 240, the management server 260 uses the communications network 240 to interface with the client device 220 when needed. However, there may be situations where the client device 220 needs servicing by the management server 260 but the client device 220 does not have network connectivity to the communications network 240. Again, the end-user of the client device 220 notifies the administrator when the client device 220 is not operating correctly. For example, the above noted software issue may cause the client device 220 to lose connectivity with the communications network 240. When connectivity to the communications network 240 is lost, then the client device 220 is not able to access a virtual computing session 212.

To address this problem of the client device 220 losing connectivity to the communications network 240, the computer system 200 advantageously provides a backup communications channel. The backup communications channel is to be used by the management server 260 to restore connectivity with the communications network 240. For example, troubleshooting by the management server 260 may determine that a reboot (as previously described above) of the client device 220 is needed to correct the software issue and restore connectivity to the communications network 240.

The backup communications channel is independent of the communications network 240, and reliably allows the management server 260 to communicate with the client device 220. This is necessary for the management server 260 to restore connectivity of the client device 220 to the communications network 240 so that the client device 220 is able to access a virtual computing session 212.

Without the backup communications channel, an administrator would have to physically go to the client device 220 to perform troubleshoot tasks in order to restore network connectivity. This becomes more challenging when there are thousands of client devices across many geographical locations. With the backup communications channel, the administrator is able to remotely access the client device 220 to perform troubleshooting tasks when there is a loss of connectivity to the communications network 240.

The backup communications channel is implemented with a cellular network connection. The cellular network connection may also be referred to as a Long-Term Evolution (LTE) connection. LTE is a wireless standard of the fourth generation (4G standard), which can carry up to 300 megabits per second to achieve higher download speeds as compared to 2G and 3G networks. In other embodiments, cellular network connections other than LTE may be used, such as 5G networks.

The cellular network connection is between the client device 220 and the management server 260. The client device 220 includes a wireless transceiver 222 to communicate with a cellular network 250. The wireless transceiver 222 is integrated into the client device 220. Likewise, the management server 260 communicates with the cellular network 250. Communications between the client device 220 and the management server 260 is bidirectional.

The backup communications channel provided via the cellular network 250 is limited to interactions with the management server 260. The backup communications channel is not used to connect the client device 220 to a virtual computing session 212. Instead, the backup communications channel is used by an administrator of the management server 260 to perform troubleshooting tasks when connectivity to the communications network 240 has been lost. Once network connectivity to the communications network 240 is restored, the client device 220 operates as normal via the communications network 240.

Since the backup communications channel is dedicated to the cellular network 250 and is independent of the communications network 240, bandwidth usage by the client device 220 is low. The client device 220 would typically consume less than a few megabits of bandwidth when communicating with the cellular network 250. The backup communications channel thus provides a cost effective management solution that reliably allows the management server 260 to communicate with the client device 220 when connectivity to the communications network 240 is not available.

The backup communications channel is primarily intended for client devices 220 that are stationary, such as a desktop computer or a thin client device, and wherein such client devices 220 do not normally include a cellular network connection. A thin client device is attractive to large enterprises and organizations because of their low costs.

A thin client is very compact since it is based on a single-board computer, as provided by Raspberry Pi, for example. The single-board computer is typically a system on a chip (SoC) with an integrated Advanced RISC Machines (ARM)-compatible central processing unit (CPU) and an on-chip graphics processing unit (GPU).

In other embodiments, the thin client 220 may be configured to operate as a workspace hub, as provided by Citrix Systems. A workspace hub is an endpoint device that supports additional functions, such as beacon-based session roaming, QR code login, and screen casting. The workspace hub advantageously integrates with IoT devices by sending webhook-style triggers when users log on and off the device. This can be used, for example, to initiate changes in IoT lighting, projectors, blinds and many other devices, as part of a smart office solution. Workspace Hub is also capable of being the common connection point for a variety of devices, including traditional USB human-input devices, as well Bluetooth thermometers, securely routing data from these devices to the application. The workspace hub also contains a Bluetooth low energy (BLE) beacon, which can be used to trigger activities based on the proximity of a user's device.

Figure 7:
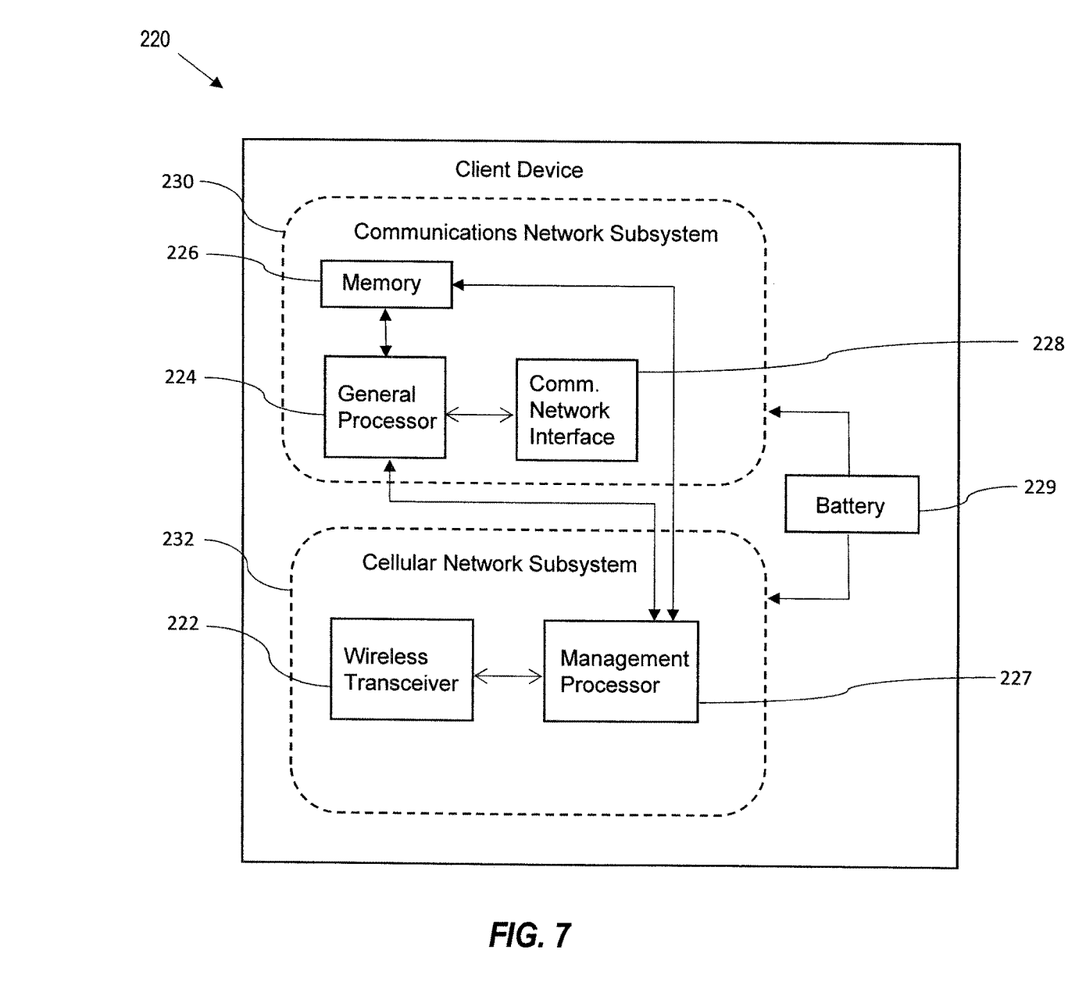
FIG. 7 is a more detailed schematic block diagram of the client device illustrated in FIG. 6.

To limit access to the cellular network 250 by the general processing of the client device 220, the wireless transceiver 222 is isolated from the general processing. This isolation may be implemented via hardware, as illustrated in FIG. 7, or via software. If the general processor 224 was to access the wireless transceiver 222, this would allow network security policies that are in place for network traffic within the enterprise or organization to be circumvented. For example, an end-user of the client device 220 may bypass a firewall within the enterprise or organization via the wireless transceiver 222.

The client device 220 may be configured with two independent subsystems 230, 232 as illustrated in FIG. 7. A communications network subsystem 230 is for normal use of the client device 220 when connected to the communications network 240. Normal use includes the client device 220 accessing a virtual computing session 212 as well as interfacing with the management server 260 via the communications network 240. A cellular network subsystem 232 is limited to management and troubleshooting tasks when the client device 220 does not have connectivity to the communications network 240.

The communications network subsystem 230 includes a general processor 224, a memory 226 coupled to the general processor 224, and a communications network interface 228 coupled to the general processor 224. The communications network interface 228 may be a wired connection (e.g., Ethernet) or a wireless connection (e.g., WiFi) to the communications network 240.

The cellular network subsystem 232 includes the wireless transceiver 222, and a management processor 227 coupled to the wireless transceiver 222. The general processor 224 may be generally referred to as a first processor, and the management processor 224 may be generally referred to as a second processor. The wireless transceiver 222 is isolated from the general processor 234 via the management processor 227. This isolation is based on the management processor 234 not being connected to the wireless transceiver 222.

The cellular network subsystem 232 remains connected to the cellular network 250, even when the client device 220 has connectivity to the communications network 240. In some embodiments, the client device 220 includes a backup battery 229. The backup battery 229 allows the management server 260 to interface with the client device 220 when there is a loss of network connectivity to the communications network 240, and the client device 220 is not plugged into a power source.

The management processor 227 is coupled to the memory 226 and to the general processor 224. The memory 226 is a shared memory between the two subsystems 230, 232. The management processor 227 is configured to perform management and troubleshooting tasks, as noted above, in order to restore connectivity to the communications network 240.

In some cases, the management and troubleshooting tasks performed by the management processor 227 may require communications with the operating system being executed by the general processor 224. These tasks may be performed via interrupt requests (IRQ). An interrupt request is a signal sent by the management processor 227 to the general processor 224 that temporarily stops a running program and allows a special program (i.e., an interrupt handler), to run instead.

Another use of the cellular network connection is to support plug and play of the client device 220. Plug and play is when the client device 220 works as intended without reconfiguration or adjustment by a user or an administrator when first connected to the communications network 240.

In plug and play, the client device 220 may require configuration parameters 264 to connect to the communications network 240 for a first time. The configuration parameters 264 may include proxy settings, for example. Proxy settings are needed by the client device 220 to connect with a proxy server.

A proxy server acts as an intermediary for requests from the client device 220 seeking resources from other servers. The client device 220 connects to the proxy server, requesting service, such as a file, a connection, a web page, or other resource available from a different server. Example proxy settings include an IP address and port number of the proxy server.

The management server 260 provides the configuration parameters 264 to the client device 220 via the wireless transceiver 222. The configuration parameters 264 are provided to the wireless receiver 222 without having to prompt an end user of the client device 220.

Another use of the cellular network connection is to detect supply chain hacking. Supply chain hacking is when the client device 220 has been compromised between being shipped from the manufacturer and plugged into the communications network 240.

In supply chain hacking detection, the client device 220 requires validation to connect to the communications network 240 for a first time. Validation information 264 is to be used to determine if the client device 220 has been compromised by a supply chain attack. The management server 260 validates the client device 220 via the wireless transceiver 222.

The management server 260 performs the validation by comparing initialization information provided by the client device to initialization information 266 expected for the client device 220. The initialization information 266 may be stored in a database, and is used to determine if files installed on the client device 220 have been altered.

When the client device 220 is shipped, the expected initialization information 266 for the client device 220 is entered into a database accessible by the management server 260. Expected initialization information 266 includes, for example, an ID assigned to the client device 220, as well as a list of files that are to be included with the client device 220.

Hardware/software based intrusion protection may be performed by comparing initialization information provided by the client device 220 to the expected initialization information 266. To protect against supply chain hacking the management server 260 performs validation over the cellular network 250 before the device is allowed to connect to the communication network 240. Validation includes, for example, checking the names and number of files that were installed on the client device 220 to see if they have been altered, checking that there are no time changes in the files, as well as checking the BIOS, etc.

Figure 8:
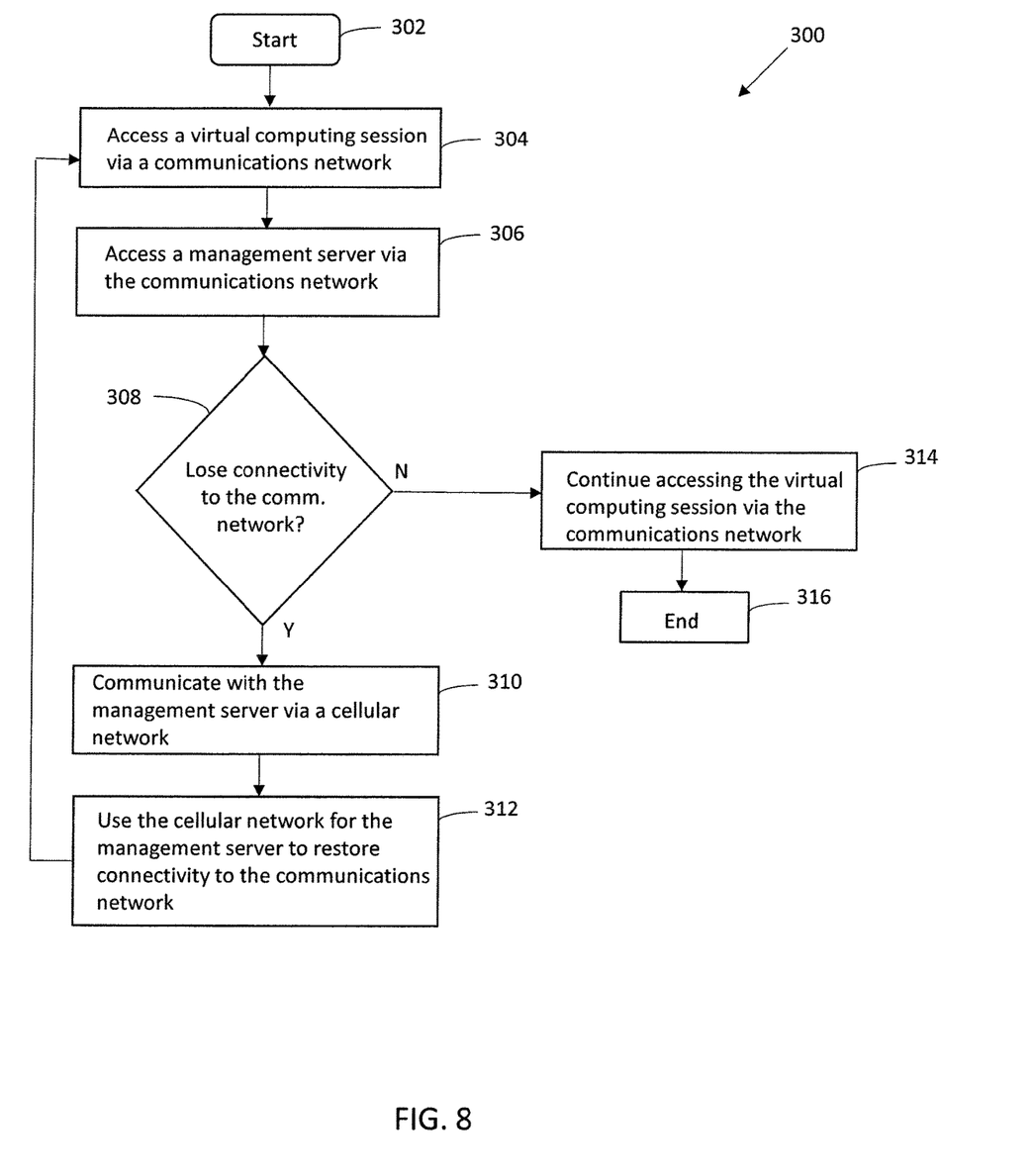
FIG. 8 is a flowchart illustrating a method for operating the client device illustrated in FIG. 6.

Referring now to the flowchart 300 in FIG. 8, another aspect is directed to a method for operating a client device 220 as described above. From the start (Block 302), the method includes accessing a virtual computing session 212 via a communications network 240 at Block 304. The client device 220 may also be accessed by a management server 260, when needed, via the communications network 240 at Block 306.

A determination is made at Block 308 on if the client device 220 loses connectivity to the communications network 240. This determination is typically made by the end-user of the client device 220 notifying an administrator of the problem. In other embodiments, the client device 220 may be configured to notify the administrator via the cellular network 250. If the client device 220 has connectivity to the communications network 240, then the client device 220 continues to access the virtual computing session 212 via the communications network 240 at Block 314.

If the client device 220 loses connectivity to the communications network 240, then the client device 220 communicates with the management server 260 via a cellular network 250 at Block 310. The cellular network 250 is used for the management server 260 to restore connectivity to the communications network 240 at Block 312. To restore connectivity, the management server 260 may reboot the client device 220, update software (e.g., BIOS) in the client device 220, or update configuration settings to enable the client device 220 to connect to the communications network 240. After connectivity to the communications network 240 has been restored, then the method loops back to Block 304 for the client device 220 to access a virtual computing session 212 via the communications network 240. The method ends at Block 316.

Figure 9:
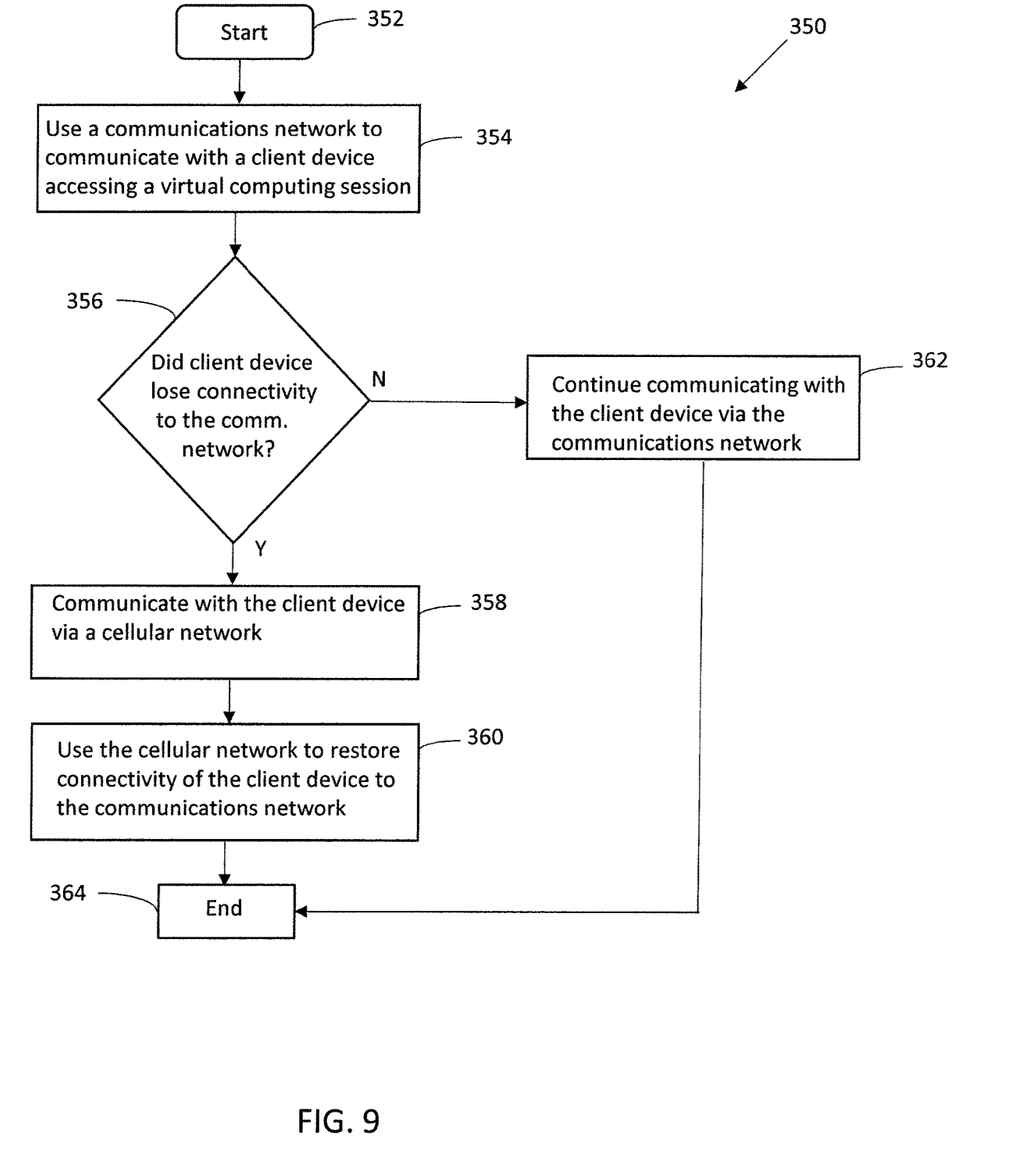
FIG. 9 is a flowchart illustrating a method for operating the management server illustrated in FIG. 6.

Referring now to the flowchart 350 in FIG. 9, another aspect is directed to a method for operating a management server 260 as described above. From the start (Block 352), the method includes establishing a communications network 240 at Block 354 to communicate with a client device 220. The communications network 240 enables the exchange of data to execute programs, applications, and sub-routines on the client device 220 as well as provision of a virtual computing session 212.

A determination is made at Block 356 on if the client device 220 loses connectivity to the communications network 240, as described above. If the client device 220 has connectivity to the communications network 240, then the management server 362 continues to communicate with the client device 220 via the communications network 240.

If the client device 220 loses connectivity to the communications network 240, then the management server 260 communicates with the client device 220 via a cellular network 250 at Block 358. The cellular network 250 is used for the management server 260 to restore connectivity to the communications network 240, as described above, at Block 360. The method ends at Block 364.

As will be appreciated by one of skill in the art upon reading the above descriptions, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A computer system comprising:
a virtual server configured to provide a plurality of virtual computing sessions;
a client device comprising:
a first subsystem comprising a communications network interface to interface with a communications network, and a first processor coupled to said communications network interface to access one of the virtual computing sessions via the communications network, and
a second subsystem comprising a wireless transceiver connected to a cellular network, and a second processor coupled to said wireless transceiver, with said wireless transceiver being isolated from said first processor based on said first processor not being connected to said wireless transceiver; and
a server configured to perform the following:
communicate with said second subsystem via the cellular network based on said first subsystem losing connectivity to the communications network, with the cellular network providing a backup communications channel for said server to restore connectivity for said first subsystem to access one of the virtual computing sessions via the communications network, and
perform management and troubleshooting tasks on said client device, with the management and troubleshooting tasks comprising a reboot said client device.

2. The computer system according to claim 1 wherein said client device is connected to the cellular network when also connected to the communications network.

3. The computer system according to claim 1 wherein said client device cannot access one of the virtual computing sessions via the cellular network based on said client device losing connectivity to the communications network.

4. The computer system according to claim 1 wherein the management and troubleshooting tasks further comprise at least one of the following: update software in said client device, and update configuration settings in said client device to enable connectivity to the communications network.

5. The computer system according to claim 1 wherein said client device receives configuration parameters to connect to the communications network for a first time from the server via said wireless transceiver.

6. The computer system according to claim 5 wherein the configuration parameters are provided to said wireless receiver without having to prompt an end user of said client device.

7. The computer system according to claim 1 wherein said server validates said client device via said wireless transceiver so that said client device can connect to the communications network for a first time.

8. The computer system according to claim 7 wherein said server performs the validation by comparing initialization information provided by said client device to initialization information expected for said client device, with the initialization information being used to determine that files installed on said client device have not been altered.

9. The computer system according to claim 1 wherein said client device is configured as a thin client device.

10. A client device comprising:
a first subsystem comprising:
a communications network interface to interface with a communications network, and
a first processor coupled to said communications network interface to access a virtual computing session via the communications network; and
a second subsystem comprising:
a wireless transceiver connected to a cellular network, and
a second processor coupled to said wireless transceiver and configured to communicate with a server based on said first subsystem losing connectivity to the communications network,
with said wireless transceiver being isolated from said first processor based on said first processor not being connected to said wireless transceiver, and receiving a reboot command from the server in response to the server performing management and troubleshooting tasks on the client device.

11. The client device according to claim 10 wherein said wireless transceiver is connected to the cellular network at the same time said communications network interface has connectivity to the communications network.

12. The client device according to claim 10 wherein said first processor cannot access the virtual computing session via the cellular network based on said communications network interface losing connectivity to the communications network.

13. The client device according to claim 12 wherein the management and troubleshooting tasks further comprise said wireless transceiver receiving at least one of the following: an update software command for the client device, and an update configuration setting command for the client device to enable connectivity to the communications network.

14. The client device according to claim 10 wherein said first processor receives configuration parameters to connect to the communications network for a first time from the server via said wireless transceiver and said second processor.

15. The client device according to claim 10 wherein the server validates operation of said first processor via said wireless transceiver so that said first processor can connect to the communications network for a first time.

16. A method comprising:
operating a first subsystem comprising a communications network interface to interface with a communications network, and a first processor coupled to the communications network interface to access a virtual computing session via the communications network; and
operating a second subsystem comprising a wireless transceiver connected to a cellular network, and a second processor coupled to the wireless transceiver and configured to communicate with a server based on the first subsystem losing connectivity to the communications network, with the wireless transceiver being isolated from the first processor based on the first processor not being connected to the wireless transceiver, and receiving a reboot command from the server.

17. The method according to claim 16 wherein the first processor cannot access the virtual computing session via the cellular network based on the communications network interface losing connectivity to the communications network.

* * * * *